US008025031B1

(12) United States Patent
Fox

(10) Patent No.: US 8,025,031 B1
(45) Date of Patent: Sep. 27, 2011

(54) AQUARIUM SNAIL COLLECTION SYSTEM

(76) Inventor: Robert O. Fox, Knoxville, TN (US)

( * ) Notice: Subject to any disclaimer, the term of this patent is extended or adjusted under 35 U.S.C. 154(b) by 61 days.

(21) Appl. No.: 12/547,758

(22) Filed: Aug. 26, 2009

(51) Int. Cl.
A01K 63/00 (2006.01)
(52) U.S. Cl. ............................................ 119/245; 43/58
(58) Field of Classification Search .................. 119/221, 119/246, 251, 252, 256, 245; D30/105, 106, D30/101; 43/58, 121
See application file for complete search history.

(56) References Cited

U.S. PATENT DOCUMENTS

| | | | | |
|---|---|---|---|---|
| 3,324,590 A | * | 6/1967 | Richardson | 43/131 |
| 3,561,402 A | * | 2/1971 | Ishida et al. | 119/221 |
| 4,091,560 A | | 5/1978 | Haertling | |
| 4,251,946 A | * | 2/1981 | Lindley | 43/131 |
| 5,175,958 A | * | 1/1993 | Wedemeyer | 43/121 |
| 5,313,912 A | * | 5/1994 | O'Dell | 119/246 |
| D351,686 S | * | 10/1994 | O'Dell | D30/106 |
| 5,622,001 A | * | 4/1997 | Kazmierzak | 43/121 |
| 6,397,780 B1 | * | 6/2002 | Youngstrom | 119/246 |
| D490,940 S | * | 6/2004 | Wang | D30/105 |
| D525,396 S | * | 7/2006 | Salvati et al. | D30/106 |
| 2009/0250011 A1 | * | 10/2009 | Biggs | 119/246 |
| 2010/0083561 A1 | * | 4/2010 | Van Dyke et al. | 43/100 |

FOREIGN PATENT DOCUMENTS

| | | | |
|---|---|---|---|
| DE | 3416606 A | * | 11/1985 |
| DE | 19832120 A1 | * | 5/2000 |
| KR | 810079 B1 | * | 3/2008 |
| WO | WO 2009092595 A1 | * | 7/2009 |

OTHER PUBLICATIONS

Snail Harbour web page, http://www.snailsrgone.4t.com/order.htm The date of this publication is not known, but it is requested that it be considered as prior art for purposes of examination.

* cited by examiner

Primary Examiner — Kimberly Smith
(74) Attorney, Agent, or Firm — Luedeka, Neely & Graham, PC

(57) ABSTRACT

An aquarium snail collection system and method, including a collector that is void of any enclosing structure and having a base and a substantially continuous and substantially permeable sidewall that extends upwardly from a central portion of the base to define an interior bait cavity. An upper portion of the sidewall is left open to permit easy access to the bait cavity and also to provide a structure that does not trap air that might cause the collector to float upwardly from the substrate.

4 Claims, 3 Drawing Sheets

US 8,025,031 B1

AQUARIUM SNAIL COLLECTION SYSTEM

FIELD

This disclosure relates to the field of fish aquariums. More particularly, this disclosure relates to a system for use in fish aquariums for collecting and removing snails.

BACKGROUND

Many species of aquarium snails exist. Some snails are considered beneficial to aquariums while others are considered to be pests. Beneficial snails are usually introduced on purpose, whereas pest snails are usually introduced by accident, mostly as hitchhikers on plants or eggs on plants. Examples of more common pest snails in freshwater aquariums are Trumpet, Ramshorn, and Pond snails. These snails reproduce at a rapid rate and can quickly become a nuisance in an aquarium if not controlled.

Various snail traps for aquariums are known. However, these are overly complicated and involve structures designed to attract and funnel snails into an enclosed trapping area. It has been discovered that such complex structures are disadvantageous and unnecessary to effectively collecting snails for removal from an aquarium. An example of such a trap is shown in U.S. Pat. No. 4,091,560.

The present disclosure relates to a system for collecting aquarium snails so that they may be easily collected and removed from the aquarium.

SUMMARY

The above and other needs are met by an aquarium snail collection system and method. The system includes an aquarium having substrate and snails, and a collector located on the substrate.

The collector is void of any enclosing structure and has a base and a substantially continuous and substantially permeable sidewall that extends upwardly from a central portion of the base to define an interior bait cavity. An upper portion of the sidewall is left open to permit easy access to the bait cavity and also to provide a structure that does not trap air that might cause the collector to float upwardly from the substrate.

The collector is not configured to trap snails, rather, the snails gather on the collector and the collector is periodically removed from the aquarium and the snails removed therefrom. The collector may then be returned to the aquarium to attract more snails and the process repeated.

BRIEF DESCRIPTION OF THE DRAWINGS

Further advantages of the disclosure are apparent by reference to the detailed description when considered in conjunction with the figures, which are not to scale so as to more clearly show the details, wherein like reference numbers indicate like elements throughout the several views, and wherein.

DETAILED DESCRIPTION

Figure 1:
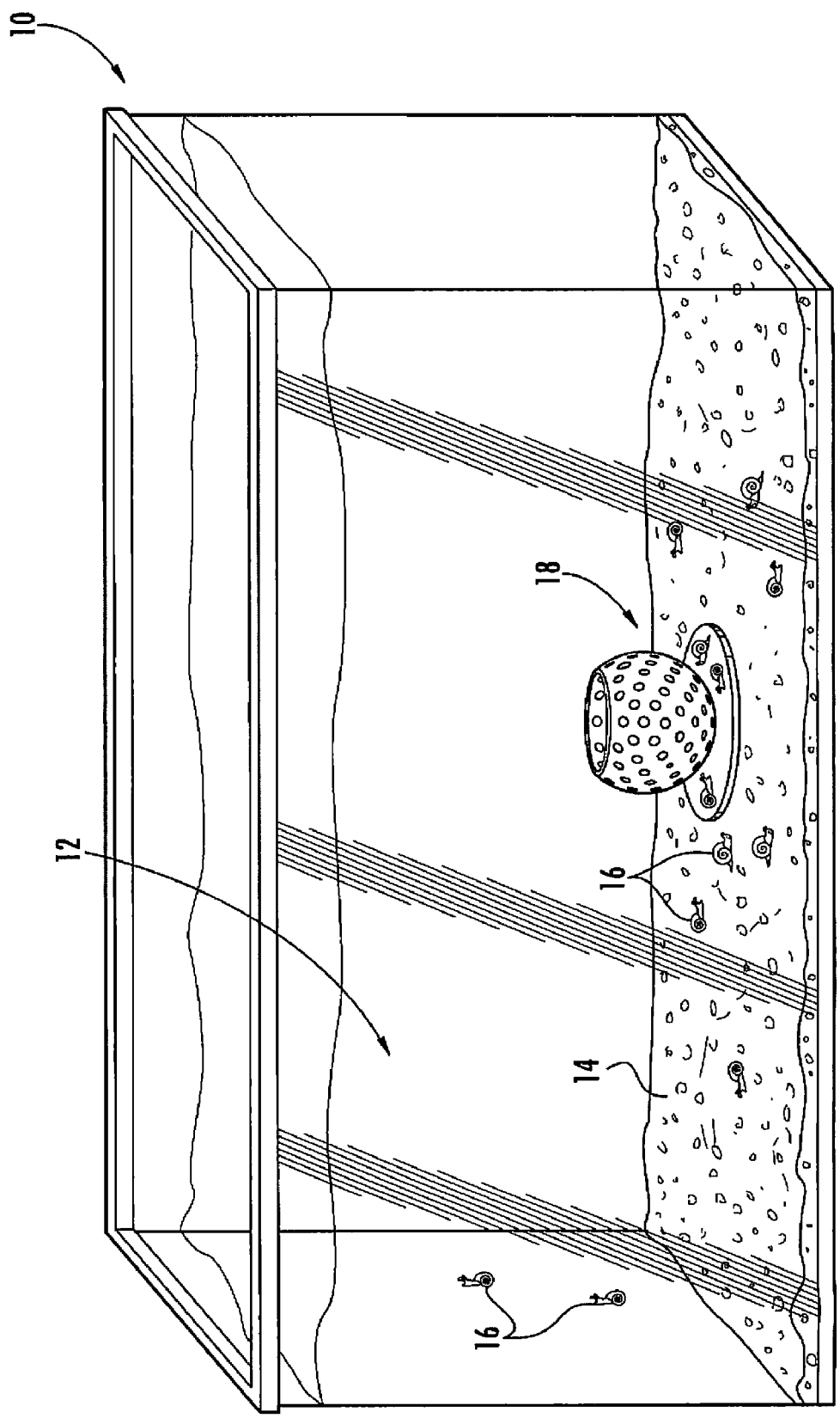
FIG. 1 is a perspective view of an aquarium snail collection system according to a preferred embodiment of the disclosure.
Figure 2:
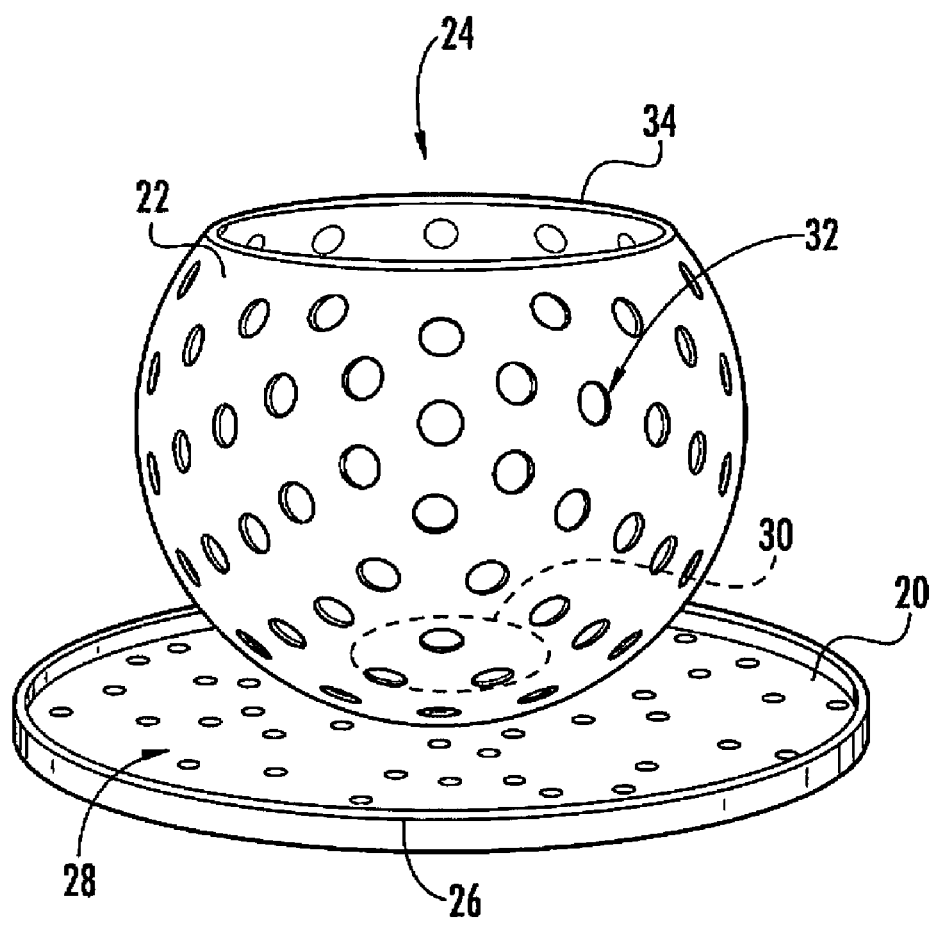
FIG. 2 is a perspective view of a collector utilized in the system of FIG. 1.

With reference to FIG. 1, there is shown an aquarium snail collection system 10 according to a preferred embodiment of the disclosure. The system 10 includes an aquarium 12 filled with water and having a substrate 14, snails 16, and a snail collector 18.

The substrate 14 may be a bare bottom of the aquarium 12 but is typically gravel, sand, or other media located at the bottom of an aquarium 12 and on which the snails 16 traverse. The snails 16 most commonly considered as pests in a freshwater aquarium are Trumpet, Ramshorn, and Pond snails. However, it will be understood that the system 10 may be used to collect other types of snails, including saltwater snails.

The collector 18 includes a substantially planar base 20 and a substantially continuous and substantially permeable sidewall 22 that extends upwardly from a central portion of the base 20 to define an interior bait cavity 24. The collector 18 is preferably made of one-piece molded plastic construction, but may be otherwise made of two or more components.

The base 20 may be of a variety of shapes, but is shown circular with an upstanding rim 26. The rim 26 is preferred to help maintain any of the snails 16 on the base 20 when the collector 18 is removed from the aquarium 12 to collect snails. A plurality of apertures 28 are preferably formed through the base 20 to let water drain as the collector 18 is removed from the aquarium 12. The apertures 28 are sized small enough so that snails do not pass through the apertures 28.

The sidewall 22 extends upwardly from the base 20 or adjacent the base 20. The sidewall 22 is a continuous structure, preferably spherical or cube-like, having a hollow interior to provide the bait cavity 24. The sidewall 22 is permeable so that a bait 30 within the bait cavity 24 may be sensed by the snails 16. The sidewall 22 preferably has a plurality of small and uniformly distributed apertures 32 to provide permeability. A preferred bait is spirulina wafers.

An upper portion of the sidewall 22 is left open to permit easy access to the bait cavity 24 and also to provide a structure that does not trap air that might cause the system 10 to float upwardly from the substrate 14. For example, prior art snail traps are constructed to have an enclosure in which the snails are trapped. However, even if small air holes are provided (holes small enough to prevent snails from passing therethrough), air bubbles tend to occur within the enclosure that cause the trap to float. This typically occurs during the initial installation and it is difficult due to the structure of the enclosure to ensure no air bubbles remain.

Accordingly, in a preferred embodiment an upper portion of the sidewall 22 remains wholly open and there is no structure incorporated in the system corresponding to an enclosure. That is, there is no structure provided to trap or otherwise enclose snails. In this regard, an upper portion 34 of the sidewall 22 is open and of a size sufficient for insertion of the bait 30 and so that air bubbles tend to not collect within the collector 18.

It has been observed that the collector 18 will remain on the substrate 14, as significant air bubbles do not collect therein. However, in the event the aquarium has a strong current that might tend to move the collector 18 from its location, a weight, such as some of the substrate 14, may be inserted into the cavity 24. Alternatively, a weight, such as metal or the like may be incorporated into the cavity 24 during manufacture of the system 10.

The system 10 is easily used to collect and remove snails. For example, the baited collector is set on the substrate 14. Typically, within a few hours, snails will be attracted to the bait and will gather around the sidewall 22 and on the base 20. The snails will tend to remain gathered and there is no need to try to trap the snails. Rather they seem to voluntarily remain on the collector 18 as long as there is bait. When desired, the collector 18 is removed from the aquarium as by grasping and lifting from the aquarium. The snails are then removed from the collector 18 as by wiping or by shaking in a bucket of water. The collector 18 may then be re-baited and returned for further collection of snails. Accordingly, the system 10 provides a simple and effective manner for collection and removal of snails that avoids disadvantages associated with traps that attempt to enclose snails.

The uncomplicated structure of the collector 18 also lends itself to aesthetic configuration. For example, as shown, the base 20 is planar and the sidewall 22 and apertures 32 resemble the appearance of a dimpled golf ball. Thus, if desired, the base 20 may be colored green and the sidewall 22 white so as to resemble a golf ball on grass. It will be appreciated that the sidewall 22 may be configured as other sports balls, such as a soccer ball, football, tennis ball and the like. Other desired ornamental appearances include configuring the sidewall 22 as a tea cup with the base 20 resembling a saucer.

Figure 3:
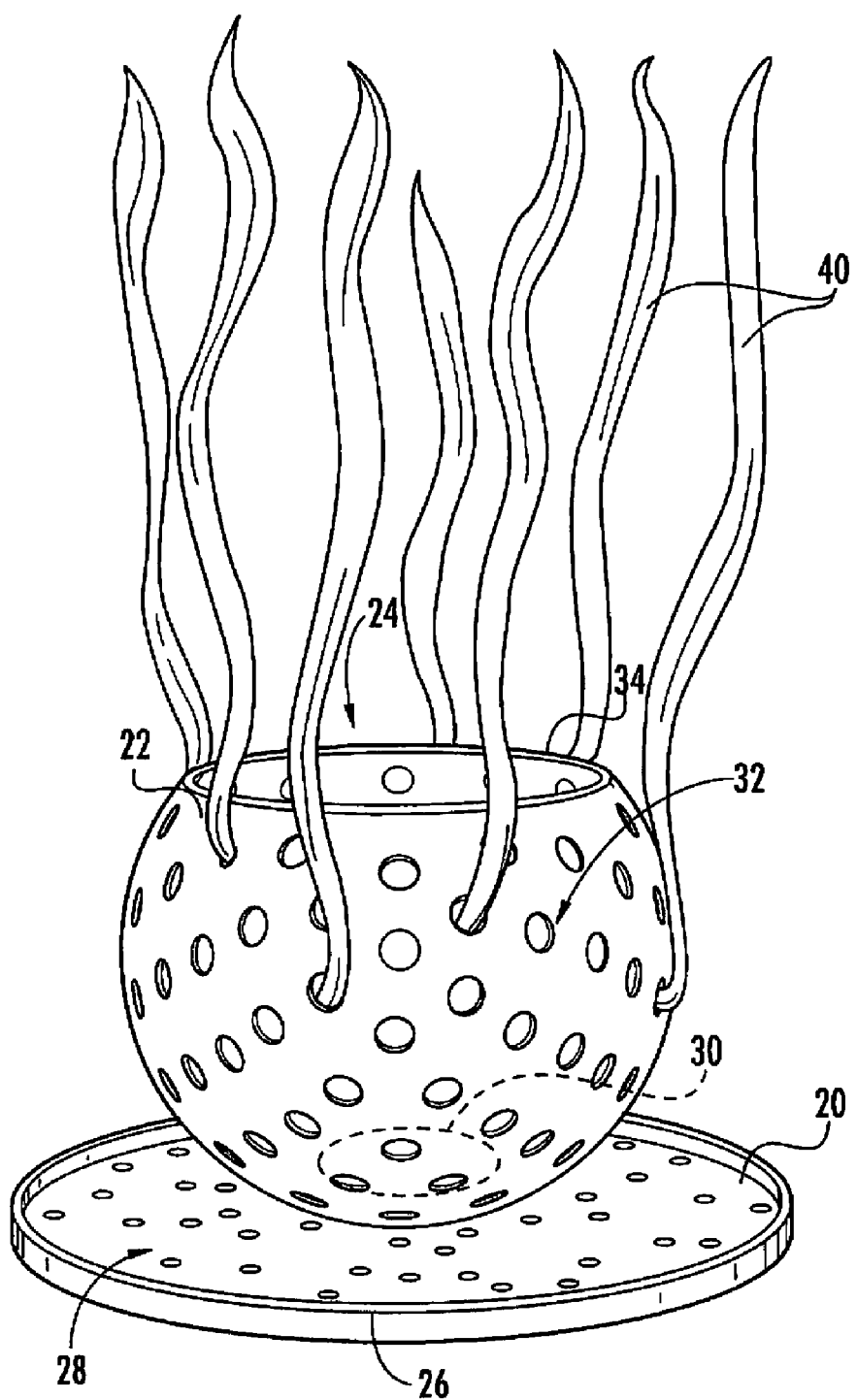
FIG. 3 is a perspective view of an alternate embodiment of a collector.

FIG. 3 shows another embodiment, wherein the sidewall 22 is constructed to appear as a bulb of a water plant, such as a water onion plant, and plastic leaves 40 extend from the sidewall 22 so that the collector 18 provides a an artificial plant for the aquarium.

The foregoing description of preferred embodiments for this disclosure has been presented for purposes of illustration and description. It is not intended to be exhaustive or to limit the disclosure to the precise form disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

What is claimed is:

1. An aquarium snail collection system, comprising: an aquarium having a substrate and a snail collector located on the substrate, the collector comprising a planar base portion and a bait containment portion, the planar base portion defining an outer perimeter and the bait containment portion comprising at least one substantially continuous and substantially permeable sidewall, the sidewall located inwardly a distance from the outer perimeter and extending upwardly from a central portion of the base, thereby defining an inner perimeter on the planar base, wherein an upper portion of the bait containment portion contains an aperture to permit unobstructed access to the bait cavity and to prevent air from being trapped within the collector;

wherein snails located with the aquarium that are attracted to bait located within the bait containment portion can reside between the outer and inner perimeters of the base portion such that by lifting the snail collector from the substrate, the snails are removed from the aquarium absent being trapped by any encasing structure.

2. The system of claim 1, wherein the sidewall is configured as a sports ball.

3. The system of claim 1, wherein the sidewall is constructed to appear as a bulb of a water plant and plastic leaves extend from the sidewall so that the collector provides an artificial plant for the aquarium.

4. A method for collecting and removing snails from an aquarium, comprising the steps of:
   a. providing an aquarium having a substrate and a snail collector, the collector comprising a planar base portion and a bait containment portion, the planar base portion defining an outer perimeter and the bait containment portion comprising at least one substantially continuous and substantially permeable sidewall, the sidewall located inwardly a distance from the outer perimeter and extending upwardly from a central portion of the base, thereby defining an inner perimeter on the planar base, and an upper portion of the bait containment portion contains an aperture to permit unobstructed access to the bait cavity and to prevent air from being trapped within the collector;
   b. placing bait in the bait containment portion and locating the baited collector on the substrate and waiting until snails are attracted to the bait and reside between the outer and inner perimeters of the base portion, and
   c. lifting the snail collector from the substrate such that the snails are removed from the aquarium absent being trapped by any encasing structure.

\* \* \* \* \*